United States Patent [19]

Maruyama et al.

[11] 4,444,134

[45] Apr. 24, 1984

[54] COMPUTER CONTROLLED PATTERN STITCHING MACHINE

[75] Inventors: Hisaichi Maruyama, Hyogo; Kohichi Ohniwa, Aichi, both of Japan

[73] Assignee: Mitsubishi Denki Kabushiki Kaisha, Tokyo, Japan

[21] Appl. No.: 300,825

[22] Filed: Sep. 10, 1981

[30] Foreign Application Priority Data

Sep. 19, 1981 [JP] Japan .............................. 55-130168

[51] Int. Cl.³ .......................................... D05B 21/00
[52] U.S. Cl. ............................................. 112/121.12
[58] Field of Search ...................... 112/121.12, 121.11, 112/102, 103, 158 E

[56] References Cited

U.S. PATENT DOCUMENTS

| | | | |
|---|---|---|---|
| 4,114,545 | 9/1978 | Manabe et al. | 112/121.15 |
| 4,220,101 | 9/1980 | Nanai et al. | 112/158 E |
| 4,290,375 | 9/1981 | Tonomura et al. | 112/121.12 |
| 4,309,950 | 1/1982 | Franklin | 112/121.12 X |
| 4,318,359 | 3/1982 | Takayama et al. | 112/158 E |

Primary Examiner—Peter P. Nerbun
Attorney, Agent, or Firm—Sughrue, Mion, Zinn, Macpeak and Seas

[57] ABSTRACT

A computer controlled pattern stitching machine includes input means 30 for supplying BCD X and Y-axis scaling signals to enlarge or contract a pattern to be sewn, control means 28 including a CPU 58, a RAM 60 and a memory 62, and drive means 32 including X and Y-axis stepping motors for moving a gripped fabric relative to a needle bar in response to signals from the control means. The stepping motors 42, 44 drive respective timing belts 66, 78, and belt 66 carries orthogonally mounted X and Y-axis rail members 70, 84 on which a cloth holding device 68 is secured.

4 Claims, 7 Drawing Figures

FIG. 3
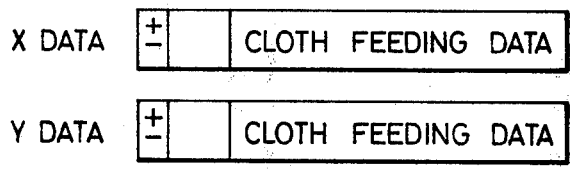
FIG. 5
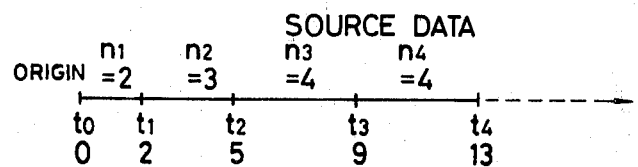
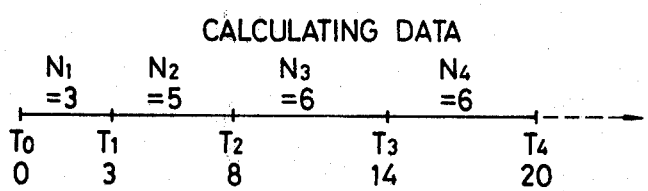
FIG. 6
Nnx = aimed data
tnx = addition value of the original data
Fsx = scaling constant
Tn-1x = calculation data addition Value up to the preceding stitching
Nnx = (tnx) x (Fsx) - (Tn-1x)

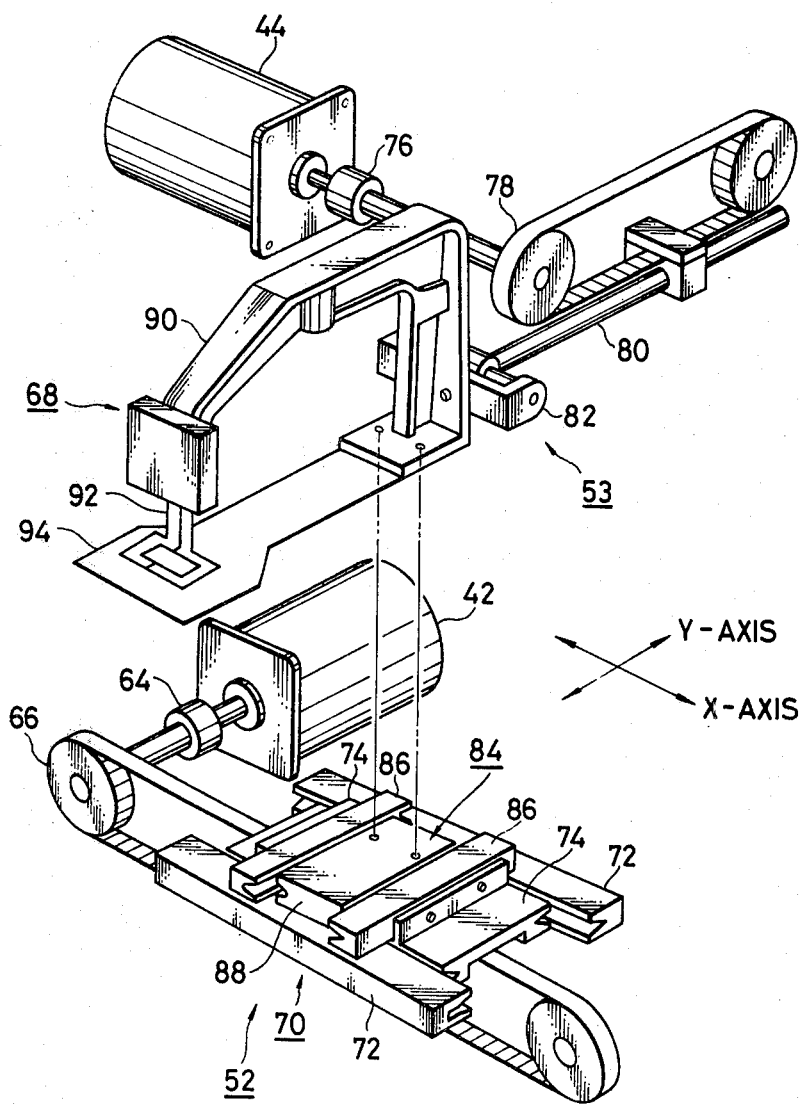

COMPUTER CONTROLLED PATTERN STITCHING MACHINE

BACKGROUND OF THE INVENTION

This invention relates to a computer controlled pattern stitching machine wherein the pattern to be sewn on a piece of cloth may be reduced or enlarged in scale.

A conventional pattern stitching machine having a scaling mechanism according to the prior art will be described in connection with FIG. 1 of the drawings, which shows a cloth feeding device provided with such a conventional scaling mechanism. A pattern cam 10 rotating in the direction of arrow A in synchronization with the rotation of a shaft arm is pivotally mounted on a cam shaft (not shown). A pattern arm 14 has a follower roller 12 at one end which rides in a cam groove 10a cut into the surface of the pattern cam 10 to carry out a predetermined pattern stitching operation. As the pattern cam 10 is rotated the pattern arm 14 swings inwardly and outwardly as indicated by arrow B through the engagement of the roller 12 with the cam groove 10a.

A scaling mechanism 16 is provided at the other end of the pattern arm 14, and includes a link 18 coupled to the pattern arm which swings back and forth as shown by arrow C in association with the arm 14, and a link 22 slidably engaged through a connecting screw 20 with a groove 18a cut in the link 18, the link 22 thus swinging back and forth as shown by arrow D in association with the movement of the link 18. The connecting screw 20 is initially slid along the groove 18a to a desired position corresponding to a predetermined scaling factor, and is then secured in such position whereafter the links 18 and 22 are pivotally coupled to each other by the screw 20.

A cloth holding device 26 is coupled to one end of the scaling mechanism 16 through an X pattern shaft schematically shown at 24. As the link 22 swings the clothing holding device 26 is reciprocated along the X-axis by the shaft 24 as shown by arrow E, and at the same time a needle bar mechanism (not shown) is reciprocated vertically in the usual manner to stitch a predetermined pattern.

The above described cloth feeding device transmits only motion in the X-axis direction to the holding device 26. The Y-axis motion is transmitted to the holding device by a similar mechanism, not shown for the sake of simplicity.

As will be clear from the above description, the desired pattern scaling factor is provided through the slidable adjustment of the connecting screw 20 in the groove 18a of link 18. Thus, if the screw 20 is moved to the left in FIG. 1 the scale of the pattern being stitched is enlarged, and vice versa. The adjustment of the connecting screw 20 in this prior art mechanical pattern scaling mechanism is both troublesome and time consuming, and the accuracy of the adjustment tends to become seriously degraded with time owing to the wear of the comparatively intricate moving components.

SUMMARY OF THE INVENTION

This invention has been developed in an effort to solve the problems described above accompanying a conventional pattern stitching machine. An object of this invention is thus to provide such a machine in which the scaling adjustment can be readily achieved and the stitching operation can be carried out with a high degree of accuracy.

The foregoing object is implemented by the provision of a pattern stitching machine according to the invention which comprises drive means having cloth feeding devices driven by electric motors, control means having a memory device for storing drive data for controlling the operation of the drive means and cloth feeding devices, and input means for supplying instructions to the control means. The control means operates to enlarge or contract a pattern being stitched in response to instructions from the input means, and reads the drive data out of the memory device sequentially to thereby appropriately drive the electric motors.

BRIEF DESCRIPTION OF THE DRAWINGS

FIG. 3 shows a diagram of the data storage arrangement in the memory device of the machine, FIG. 4 shows a perspective view of the cloth feeding mechanism in the pattern stitching machine of the invention, FIG. 5 shows an explanatory diagram of the scaling data transition in the pattern stitching machine of the invention, FIG. 6 shows the scaling calculation equation employed in the invention and the individual parameters of such equation.

DETAILED DESCRIPTION OF THE PREFERRED EMBODIMENT

Figure 1:
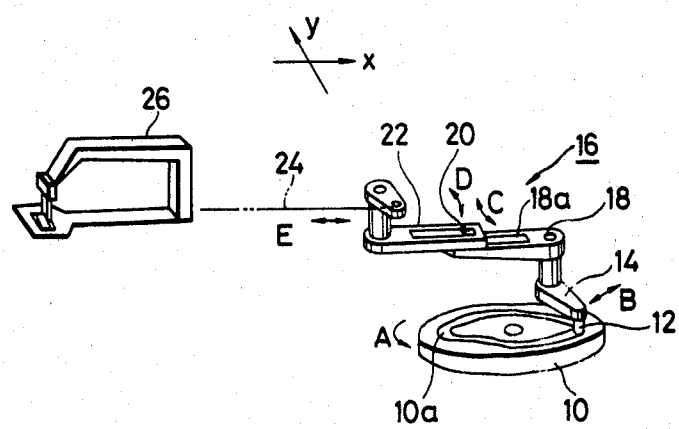
FIG. 1 shows a schematic perspective view of a pattern stitching mechanism according to the prior art.
Figure 2:
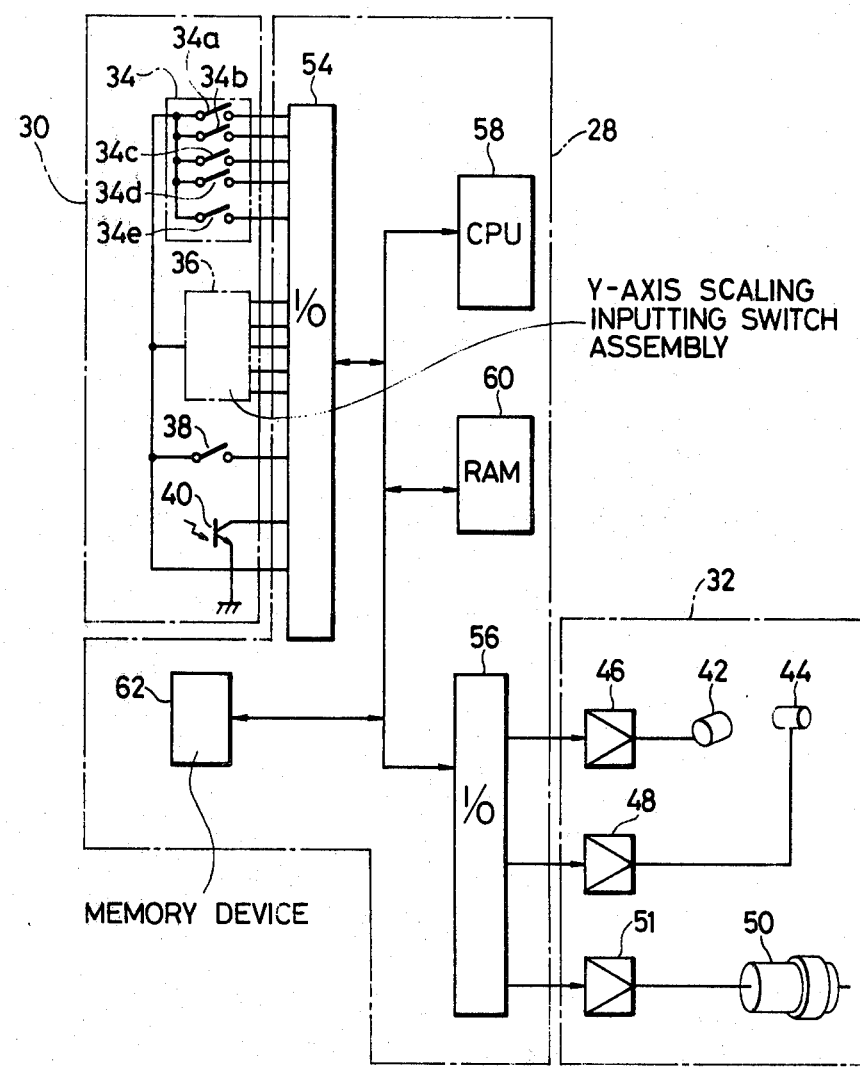
FIG. 2 shows a schematic block diagram of a pattern stitching machine according to the present invention.

Referring now to the drawings, the pattern stitching machine of the invention as shown in FIG. 2 comprises a control device 28, an input device 30 for supplying various data signals to the control device, and drive means 32 responsive to output signals from the control device.

The input device 30 comprises an X-axis scaling switch assembly 34, a similar Y-axis scaling switch assembly 36, a start switch 38, and a position detector 40 which provides an output signal only when a sewing needle (not shown) is disposed at a predetermined position above a piece of cloth or fabric to be stitched. The X-axis scaling switch assembly 34 comprises a positive or negative sign determining switch 34a and BCD (binary coated decimal) switches 34b through 34e for specifying the absolute value of the scaling factor. The individual switch arrangement within the Y-axis scaling switch assembly 36 is identical. The input device 30 can thus implement scaling adjustments in sixteen (16) discrete steps, although it will be understood that additional steps can easily be provided by simply increasing the number of BCD switches.

The drive means 32 comprises an X-axis pulse drive motor 42, a Y-axis pulse drive motor 44, amplifiers 46 and 48 for driving the motors 42 and 44, respectively, a variable speed machine drive motor 50 and an amplifier 51 therefor. X and Y-axis cloth feeding devices 52 and 53 (FIG. 4) including the motors 42 and 44 implement a predetermined cloth feeding operation, described later.

The control device 28 includes a signal input/output array or port 54 which receives signals from and transmits signals to the components of the input device 30, an input/output port 56 for applying drive control signals to the amplifiers 46, 48 and 51 in the drive means 32, and a CPU (central processing unit) 58 for exchanging data with the signal ports 54 and 56 to control the entire pattern stitching operation. The control device 28 further comprises a RAM (random access memory) 60 for storing scaling calculation results generated by the CPU 58 according the data inputted through the port 54 from the X and Y-axis scaling switch assemblies 34 and 36, and a memory device 62 in which data required for the CPU 58 to control the motors 42, 44 and 50 is stored.

FIG. 3 shows the arrangement of the drive data for the pulse motors 42 and 44 as stored in the memory device 62. The data specifying the directions of rotation of the pulse motors is stored at the most significant bit positions of the X and Y-axis data formats, while the binary pulse commands for the motors are stored in the least significant bit positions, as shown on the right in FIG. 3.

The X-axis cloth feeding device 52, as shown in FIG. 4, includes a toothed timing belt 66 driven via a gear and coupling 64 by the X-axis pulse drive motor 42 mounted on a machine arm, not shown. An X-axis rail member 70 is secured to the belt 66 and drives a cloth holding device 68 in the X direction as described below. The rail member 70 includes a pair of parallel and opposite stationary rails 72 fixedly secured to the machine bed (not shown) and a sliding plate 74 mounted via bearings (not shown) on the rails 72 and secured to the belt 66 for driven movement in the X direction.

The Y-axis feeding device 53 includes a toothed timing belt 78 driven via a gear and coupling 76 by the Y-axis pulse drive motor 44 which is disposed orthogonal to the motor 42 and which is similarly secured to a machine arm of the apparatus. A transmission shaft 80 is secured to the belt 78 and has a bearing 82 mounted on one end thereof which implements free sliding movement of the cloth holding device 68 in the X direction via a yoke and pin arrangement. A Y-axis rail member 84 is mounted on the X-axis rail member 70 in an orthogonal orientation. The rail member 84 comprises a pair of parallel stationary rails 86 fixedly secured to the moving plate 74, and a movable plate 88 slidably mounted between the rails 86 by bearings, not shown.

The cloth holding device 68 is fixedly mounted on the moving plate 88 of the Y-axis rail member 84. The holding device 68 includes the bearing 82, a cloth retaining arm 90 secured to the moving plate 88, a cloth retainer 92 provided at the end of the arm 90, and a cloth retaining lower plate 94 disposed below the retainer 92. As the pulse drive motors 42 and 44 are stepped the cloth holding device 68 is correspondingly moved in both the X and Y directions, thus implementing the sewing of a predetermined pattern in association with the needle bar of the stitching machine.

The scaling operation will be described, by way of example, with reference to the X-axis direction. For simplification it will be assumed that the original starting point is at "zero" and that the data being handled is positive in sign or polarity. It will further be assumed that, as shown in FIG. 5, the X-axis position command stored in the memory device 62 is "2 3 4 4", and that a scaling instruction factor of 1.5 is supplied by or set into the switch assembly 34. The predetermined data necessary to operate the various drive motors is obtained by processing these X-axis data commands, and the calculation method therefor is illustrated in FIG. 6. If the addition value of the original data stored in the memory device 62 and the scaling constant are represented by $t_{nx}$ and $F_{sx}$, respectively, and the calculation data addition value up to the preceding stitching operation is represented by $T_{n-1x}$, then the desired data signal $N_{nx}$ is given by:

$$N_{nx} = (t_{nx}) \times (F_{sx}) - (T_{n-1x}).$$

The data obtained from the foregoing equation provides the number of pulses for driving the motor 42, and is rounded off to one decimal place. Thus, the resultant data for the example given is $N_1=3$, $N_2=5$, $N_3=6$ and $N_4=6$, as shown in the bottom portion of FIG. 5.

Figure 7:
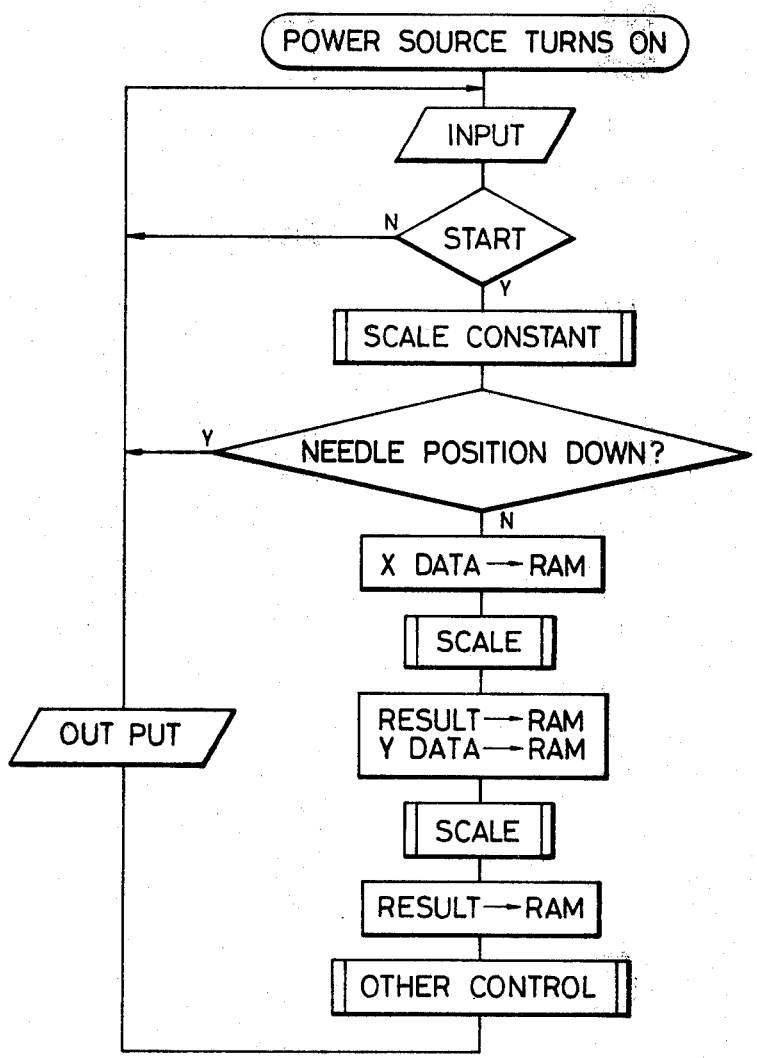
FIG. 7 shows a flow diagram of the operational and control sequences implemented by the invention.

The above described scaling calculation and the entire control operation are illustrated by the flow diagram of FIG. 7. When the power switch is initially turned on the input data from the X and Y-axis scaling switch assemblies 34 and 36 is supplied to the CPU 58 from the memory device 62. When the start switch 38 is closed under these conditions, the CPU 58 provides a scaling constant $F_{sx}$ to enable the calculation shown in FIG. 5 according to the input data supplied by the switch assemblies 34 and 36. When the position detector 40 determines that the needle is at a predetermined position relative to the cloth, the CPU 58 initiates the scaling calculation as indicated in FIG. 6 and temporarily stores the results in the RAM 60.

The CPU 58 also processes the other necessary control signals, i.e. the signals for driving the variable speed motor 50, etc., and applies the process results and the scaling calculation results stored temporarily in the RAM 60 to the motors 42, 44 and 50 through their respective drive amplifiers 46, 48 and 51. The X and Y-axis pulse drive motors 42 and 44 are thus rotated through a predetermined number of steps or pulses obtained through the scaling calculation, to thereby stitch the desired pattern in association with the machine driving variable speed motor 50.

In the foregoing embodiment the X and Y-axis scaling switch assemblies 34 and 36 comprise BCD switches, but they may easily be replaced by variable resistors coupled with analog-to-digital converters to supply the necessary input signals to the CPU 58. Similarly, the pulse motors 42 and 44 may be replaced by linear actuators or servo motors to achieve the same effect.

As is apparent from the foregoing description, according to the present invention a control device including a CPU carries out the pattern scaling calculations, and the cloth feeding devices are driven by pulse motors operated in accordance with the results of such calculations. Scaling can thus be readily implemented over a wide range and to a high degree of precision. Furthermore, since the scaling operation is carried out in a primarily electrical mode, mechanical wear problems as attendant with the prior art mechanism are avoided. The stitching accuracy can thus be maintained at a high level over a prolonged period of usage, and the background noise generated during the operation of the machine is also reduced.

There is driving control information including the information for sewing machine starting and cutting a thread (not shown), in pulse motor driving information (cf. FIG. 3) which is memorized in the memory device 62.

Operations and movement of the apparatus are as follows;

First of all a cloth is held between the cloth retainer 92 and the cloth retainer lower plate 94 (control method and figure are omitted). Next whether enlarging or contracting a pattern is indicated by the scaling switches 34 and 36. If the start switch 38 turns on, in accordance with the flowchart program (FIG. 7), CPU 58 operates to enlarge or contract the pulse motor driving information which is memorized in the memory device 62 and outputs it to the pulse drive motors 42 and 44. Then, CPU 58 makes the motor 50 start by a sewing machine starting information and drives a sewing structure (Fig. is omitted) of the sewing machine. The driving information is outputted to the pulse motor when sewing needle is at the upper position every one rotation synchronizing to the rotation corresponding to 15 pulses. The information in the memory device 62 is disposed in order. The pulse drive motors are drived by the information which is either enlarged or contracted pulse motor driving information in the memory device. The stitches are formed along the pattern with size indicated by the scale switches 34 and 36. The start switch 38 can be turned off after the sewing machine started. On the sewing state, if there are the thread cutting information in the pulse motor driving information, the thread cutting signal is outputted to the sewing machine by CPU 58 and the sewing machine does not cut the thread after the position at which the needle is lower and low speed is detected. Last of all, the cloth retainer 92 goes up, cloth is released, and sewing operation is finished.

What is claimed is:

1. A pattern stitching machine, comprising:

drive means (32) including cloth feeding devices driven by electric motors (42, 44);

control means (28) including a memory device (62) for storing data for controlling the driving of said electric motors, and a microcomputer (58) for controlling the operation of said drive means and said cloth feeding devices; and input means (30) for supplying control instructions to said control means, said control means operating to enlarge or contract a pattern to be stitched in response to control instructions from said input means and to read said drive control data out of said memory device sequentially to control the drive of said electric motors, wherein said drive means includes an X-axis cloth feeding pulse drive motor (42), a Y-axis cloth feeding pulse drive motor (44), and a sewing machine drive motor (50), and wherein said drive means further comprises an X-axis cloth feeding device (52) having said X-axis drive motor coupled thereto through a coupling (64) to a first timing belt (66), an X-axis rail member (70) on which a cloth holding device (68) is disposed for movement in the X direction, said X-axis rail member comprising X-axis stationary rails (72) mounted on a machine bed, and a first moving plate (74) which is mounted through bearings on said stationary rails and which is secured to said first timing belt to move therewith in the X direction, and a Y-axis cloth feeding device (53) having said Y-axis drive motor (44) disposed orthogonal to said X-axis drive motor and fixedly secured to a machine arm coupled to said Y-axis feeding device through a coupling (76) to a second timing belt (78), a bearing (82) being provided at the end of a shaft (80) secured to the second timing belt to move therewith in the Y direction, said cloth holding device being secured to the end of said bearing, a Y-axis rail member (84) mounted on said X-axis rail member orthogonal thereto, said Y-axis rail member having Y-axis stationary rails (86) secured orthogonal to said moving plate of said X-axis rail member, and a second moving plate (88) mounted on said Y-axis stationary rails through bearings, said cloth holding device being secured on said second moving plate of said Y-axis rail member and comprising said bearing, a cloth retaining arm (90) secured to said second moving plate, a cloth retainer (92) provided at the end of said cloth retaining arm, and a cloth retaining lower plate (94) provided below said cloth retainer.

2. A machine as claimed in claim 1, wherein said control means further comprises a RAM.

3. A machine as claimed in claim 1, wherein said input means includes scaling switches, a start switch and a position detector.

4. A machine as claimed in claim 1, wherein said data for controlling the drive of said electric motors is calculated by said microcomputer according to the equation:

$$N_{nx} = (t_{nx}) \times (F_{sx}) - (T_{n-1x})$$

wherein:

$N_{nx}$ = the desired motor drive control data, $t_{nx}$ = the addition value of the original data stored in the memory device $F_{sx}$ = a scaling constant, and $T_{n-1x}$ = the calculated data addition value up to the preceding stitching operation.

* * * * *